Feb. 20, 1951 — W. J. RUSSELL — 2,542,435
HANDLE FASTENING MEANS FOR PRESSURE COOKER CLOSURES
Filed May 10, 1945 — 2 Sheets-Sheet 2
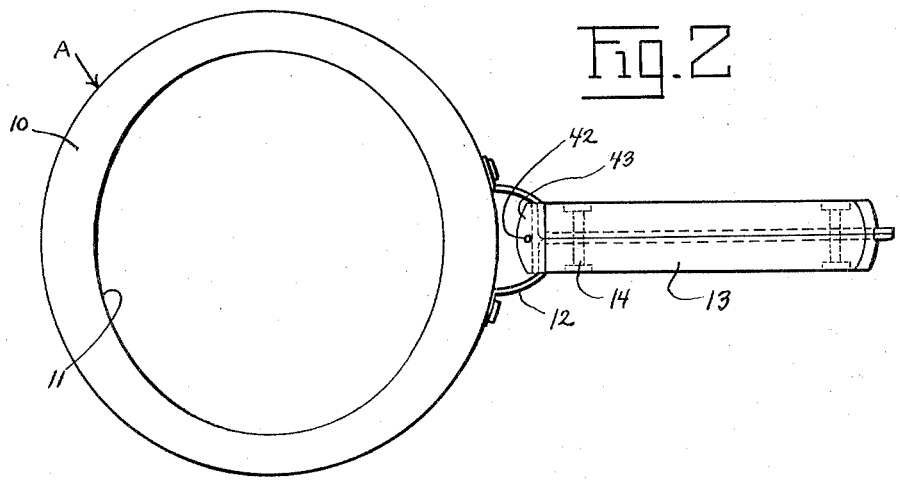
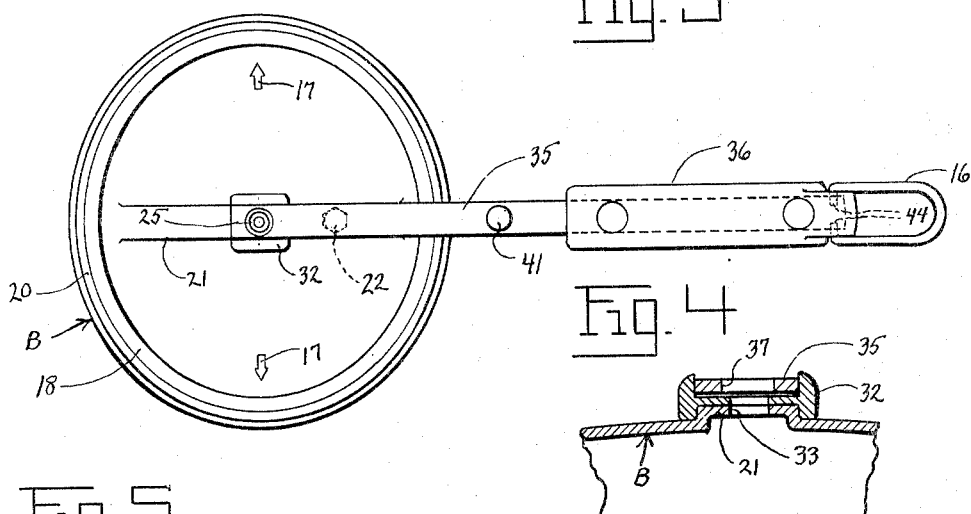
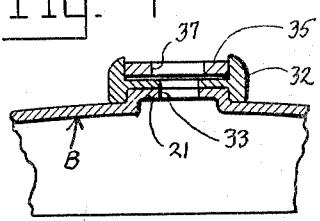
Inventor
William J. Russell
By Lindsey and Robillard
Attorney Patented Feb. 20, 1951

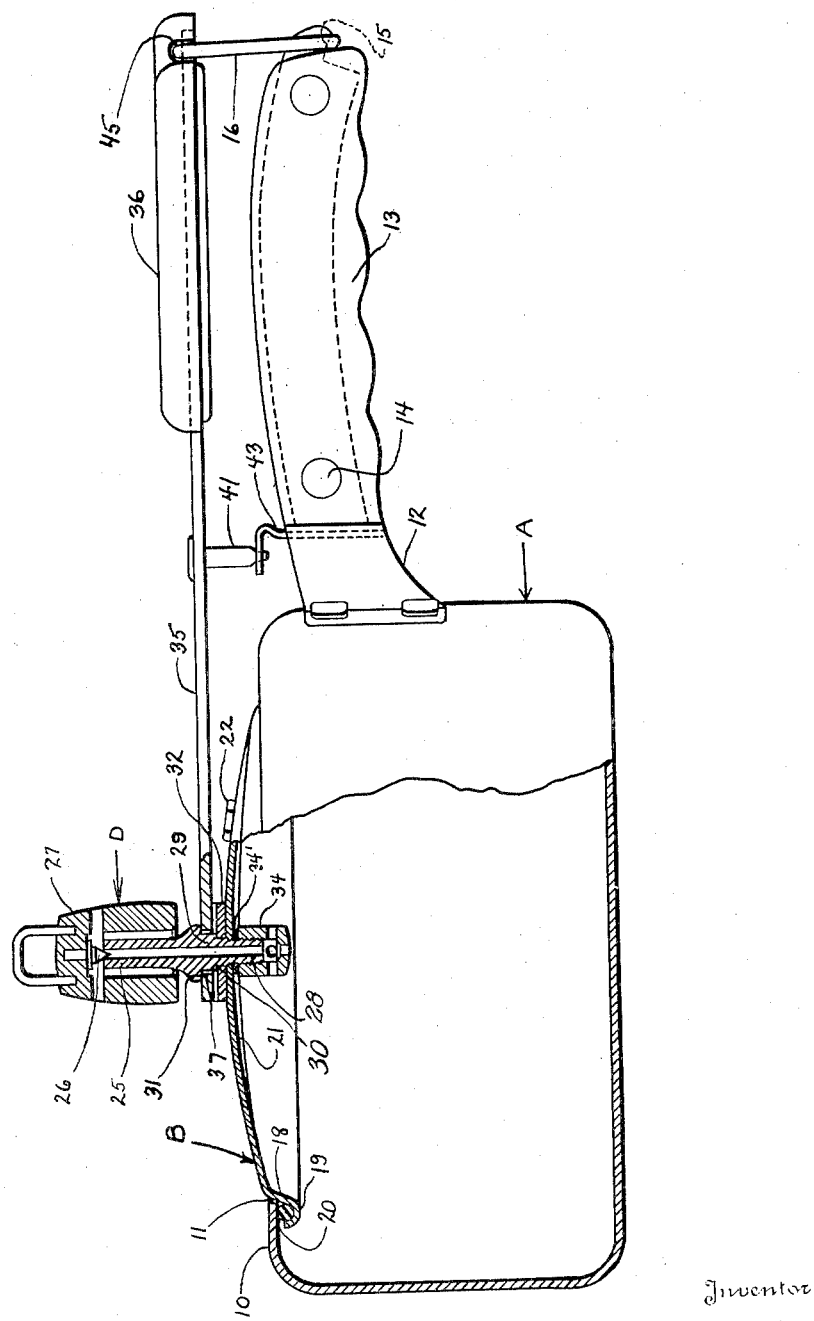

2,542,435

UNITED STATES PATENT OFFICE 2,542,435

HANDLE FASTENING MEANS FOR PRESSURE COOKER CLOSURES

William J. Russell, Newington, Conn., assignor to Landers, Frary & Clark, New Britain, Conn., a corporation of Connecticut Application May 10, 1945, Serial No. 592,974

4 Claims. (Cl. 220—56)

This invention relates to pressure cookers and has particular reference to closures therefor.

The aim of the invention is to provide a pressure cooker with a simple, durable, and inexpensive closure and means for securing it in position upon the vessel which are so constructed and arranged that the closure may be very easily and conveniently secured in, and removed from, position with slight effort and a minimum of manipulation, and the closure or cover, during a cooking operation, is tightly maintained in sealed relation relative to the vessel or container by the pressure pertaining within the vessel.

Other objects will be in part obvious and in part pointed out more in detail hereinafter.

The invention accordingly consists in the features of construction, combination of elements and arrangement of parts which will be exemplified in the construction hereafter set forth and the scope of the application of which will be indicated in the appended claims.

In the accompanying drawings, wherein is shown one embodiment which the present invention may take:

Figure 1 is a side elevational view of a pressure cooker constructed in accordance with the present invention, portions being in section for purposes of illustration;

Fig. 2 is a top plan view of the vessel or container with the cover removed;

Fig. 3 is a top plan view of the cover together with the handle to which it is connected;

Fig. 4 is a central sectional view through the cover, this view being taken substantially at right angles to the plane at which the cross section of Fig. 1 is taken; and Fig. 5 is a perspective view of an anchor or head piece for preventing rotation between the cover and the handle bar therefor.

Referring to the drawings in detail, A denotes a vessel or container which may be formed of aluminum or other suitable metal. The top wall 10, which is in the form of an inwardly directed flange, has an elliptical opening 11. Extending from the side of the vessel and disposed at right angles to the major axis of the opening 11 is a handle which, in the present illustrative disclosure, comprises a handle bracket 12 and a hand grip 13. The handle bracket is shown as being formed of two complementary metal strips with their forward ends bowed outwardly and secured to the side wall of the vessel. The hand grip comprises two complementary handle scales secured to the bracket by rivets 14. The outer end of the bracket extends beyond the hand grip 13 and its bottom edge is directed downwardly and outwardly, as at 15, so as to form a hook or keeper beneath which the hereinafter described locking bail 16 is adapted to engage.

The letter B generally designates the cover which may also be formed of aluminum. This cover corresponds in outline to the elliptical opening 11 but is larger than that opening. The major axis of the cover is indicated by the arrows 17 provided on the upper surface of the cover. The cover is somewhat crowned and has at its periphery a slightly outwardly flared skirt 18, the edge of which is curled outwardly and upwardly so as to form an open bead 19 in which is seated a gasket 20 in the form of a rubber or resilient ring. As shown in Fig. 1, the skirt 18 extends through the opening 11, and the gasket is adapted to seat against the under face of the flange 10 about the opening 11. The cover has, along its minor axis, a raised rib or corrugation 21. The numeral 22 designates a safety plug which may be of any suitable construction.

Carried by the cover at its center is a pressure relief valve D which comprises generally a vent tube 25 and a valve head 26 carried by a weight 27. The vent tube, at its lower end, has an attaching portion 28 of reduced diameter, an intermediate portion 29 of larger diameter, a radial shoulder 30 between said portions, and a radial shoulder 31 at the upper end of the intermediate portion. The attaching portion 28 of the vent tube extends through a hole in an anchor or head piece 32 and a central hole 33 in the cover, and the shoulder 30 engages upon the anchor piece. The lower end of the tube is externally threaded so as to receive a vented lock nut 34 adapted to bear against a gasket 34'.

The cover is connected at its central portion through the vent tube to a handle bar 35 comprising a hardened and tempered steel strip so that the same is resilient. On the outer end of this handle bar is a plastic handle 36. As will be seen from Fig. 1, the forward end of the handle bar has an opening 37 through which the intermediate portion 29 of the vent tube extends. The opening 37 is of somewhat larger diameter than this intermediate portion, and the length of the intermediate portion is somewhat greater than the thickness of the bar so that the cover may float or tilt slightly with respect to the bar and thus accommodate itself to a seating position within the vessel. When the parts are in position, the upper surface of the bar about the opening 37 bears against the shoulder 31 on the vent tube. In order to prevent turning movement between the handle bar and the cover without exerting any undue strains on the cover, the aforementioned anchor or head piece 32 is provided. This head piece is generally I-shaped in cross section, and the depending side flanges straddle the corrugation 21 on the cover, and the upwardly extending flanges straddle the forward end of the bar 35.

When the cover is in closing position with respect to the vessel, the handle bar 35 is fulcrumed midway between its ends and the latch 16 on the extreme outer end of the handle bar is engaged with the outer end of the vessel handle. More particularly, the handle bar, at its central portion, is provided with a depending pivot stud 41, the lower end of which has a teat adapted to engage in an opening 42 provided in a bracket 43 which is welded or otherwise secured in the crotch of the handle bracket 12. The latch 16 is in the form of a wire bail or loop which straddles the outer end of the handle bar. The loop is provided with inturned ends or pintles 44 which extend inwardly over the outer end of the handle bar. The pintles 44 extend through notches 45 in the cover handle 36. The closed end or cross bar of the loop is adapted to engage the inclined or keeper edge 15 of the vessel handle, as shown in Fig. 1, and when so engaged the handle bar is flexed slightly so as to resiliently urge the cover upwardly against the flange 10 of the vessel.

With this arrangement, the cover may be very easily and quickly applied to the vessel and removed therefrom. After the food to be cooked has been placed in the vessel, the cover is positioned over the open top of the vessel with the handle bar 35 at approximately right angles to the hand grip 13, the arrows 17 being in line with the hand grip. In this position, the narrow part of the oval-shaped cover is in line with the wide part of the elliptical opening in the top of the vessel. The cover is tilted slightly by turning the handle bar about its axis, and then the lowered edge of the cover is slid into the opening 11 and under the top wall 10 sufficiently to permit the up-tilted edge of the cover to be lowered into the vessel through the opening 11. The cover, by means of the handle bar and the handle 36, is then turned so as to position the handle 36 over the hand grip 13, and the teat of the pivot stud 41 is engaged in the opening 42 provided in the bracket 43. Thereupon, the two handles may be gripped in one hand and pressed towards one another so that the cover is raised to its final position within the vessel, and the loop or latch 16 may be swung downwardly and forwardly so that the cross bar thereof will lie below the keeper edge 15. Force on the handles is then released, whereupon the outer end of the bar will flex upwardly until the cross bar of the latch engages the keeper edge. Due to the fact that the bar is under some slight flexure, the latch is resiliently held against the keeper, and the cover is resiliently held to its seat against the top wall of the vessel. During the cooking operation, the pressure of the vapor within the vessel further holds the cover to its seat, and the cover cannot be removed while the pressure within the vessel is such as to make it dangerous to remove the cover. After the food has been cooked, the vessel is allowed to stand until the vapor pressure therein is reduced through the vent tube, and when the pressure has fallen to a negligible amount, the cover may be removed by following the foregoing operations in the reverse order.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

It is also to be understood that the language used in the following claims is intended to cover all of the generic and specific features of the invention herein described and all statements of the scope of the invention which, as a matter of language, might be said to fall therebetween.

I claim as my invention:

1. In a pressure cooker of the type comprising a vessel having a top wall provided with an elliptical opening, a handle secured to the side wall of said vessel and extending radially therefrom in the direction of the minor axis of said opening, an elliptical cover conforming in shape to, and of larger size than, said opening and having about its margin a seating edge adapted to seat against the under side of said top wall about said elliptical opening when the cover is in place, the minor axis of said cover being of lesser extent than that of the major axis of said opening whereby the cover may be inserted into the vessel through said opening, a resilient handle bar, means for fulcruming said handle bar between its ends over said handle with the handle bar generally parallel to and spaced above the handle, and means for releasably latching the handle bar to the handle, the combination with said handle bar and cover of a connecting element fixed to the center of said cover, and having a shoulder facing downwardly toward the cover, said handle bar having an opening larger than said connecting element at the non-latching end thereof, said connecting element being loosely positioned in said opening with its shoulder above the opening, an interlocking member mounted on said connecting element between said handle bar and said cover, said cover having an abutment engageable with said interlocking member and said interlocking member having an abutment engageable with said handle bar to limit relative rotation between the cover and the handle bar.

2. In a pressure cooker of the type comprising a vessel having a top wall provided with an elliptical opening, a handle secured to the side wall of said vessel and extending radially therefrom in the direction of the minor axis of said opening, an elliptical cover conforming in shape to, and of larger size than, said opening and having about its margin a seating edge adapted to seat against the under side of said top wall about said elliptical opening when the cover is in place, the minor axis of said cover being of lesser extent than that of the major axis of said opening whereby the cover may be inserted into the vessel through said opening, a resilient handle bar, means for fulcruming said handle bar between its ends over said handle, and means for releasably latching the handle bar to the handle, the combination with said handle bar and cover of connecting means forming a tiltable but non-rotatable connection therebetween comprising a vent tube extending through a central opening in said cover and rigidly fixed thereto, said vent tube having an intermediate portion loosely received through an opening in the end of the handle bar, said portion having a downwardly facing shoulder at its upper end adapted to abut against the handle bar when the connection is under tension, an anchor piece of I-shaped cross section having upwardly extending flanges engaging the side edges of the handle bar, and a raised rib along the minor axis of the cover extending between the depending side flanges of the anchor piece whereby relative rotation of the cover and handle bar is prevented.

3. The combination set forth in claim 1 including connecting means between the outer ends of the handle bar and the handle effective when the cover is in place in the elliptical opening and the handle bar and handle are squeezed together to retain the handle bar under bending stress.

4. The combination set forth in claim 1 including connecting means between the handle bar and handle comprising a latching loop mounted to freely pivot radially outward from the outer end of the handle bar, and a keeper mounted on the end of the handle having a lower edge disposed at a greater distance from the vessel than the latching loop pivot for engaging the latching loop and having an upper curved surface for camming the latching loop outwardly and around the keeper when the handle bar and handle are first squeezed together whereupon the latching loop may fall into engagement with the lower edge of the keeper to retain the handle bar under bending stress.

WILLIAM J. RUSSELL.

REFERENCES CITED

The following references are of record in the file of this patent:

UNITED STATES PATENTS

| Number | Name | Date |
| --- | --- | --- |
| 561,584 | Hammond | June 9, 1896 |
| 606,949 | Wilson | July 5, 1898 |
| 2,121,596 | Hill | June 21, 1938 |
| 2,176,306 | Kuss | Oct. 17, 1939 |
| 2,282,011 | Vischer, Jr. | May 5, 1942 |

FOREIGN PATENTS

| Number | Country | Date |
| --- | --- | --- |
| 4,993 | Great Britain | Feb. 28, 1910 |
| 9,122 | Great Britain | 1905 |
| 33,108 | France | Feb. 14, 1928 |
| 33,871 | France | Aug. 28, 1928 |
| 131,323 | Switzerland | Apr. 16, 1929 |
| 630,277 | France | Aug. 16, 1927 |